United States Patent
Mazur et al.

(10) Patent No.: US 7,567,498 B2
(45) Date of Patent: Jul. 28, 2009

(54) PHONOGRAPHIC TURNTABLE WITH BUILT-IN AUDIO TO USB OR FIREWIRE DEVICE

(75) Inventors: James Mazur, Ft. Lauderdale, FL (US); Alan Flum, Tamarac, FL (US); Erik Themmen, Pompano Beach, FL (US); Mark Demouy, Hollywood, FL (US); Darrin Young, Ft. Lauderdale, FL (US)

(73) Assignee: Stanton Magnetics, Inc., Boynton Beach, FL (US)

( * ) Notice: Subject to any disclaimer, the term of this patent is extended or adjusted under 35 U.S.C. 154(b) by 651 days.

(21) Appl. No.: 10/862,942

(22) Filed: Jun. 8, 2004

(65) Prior Publication Data

US 2005/0270926 A1    Dec. 8, 2005

(51) Int. Cl.
*G11B 7/00* (2006.01)

(52) U.S. Cl. .......................................... 369/174; 369/9

(58) Field of Classification Search ................. 369/128, 369/127, 155, 264, 174
See application file for complete search history.

(56) References Cited

U.S. PATENT DOCUMENTS

| | | | |
|---|---|---|---|
| 5,740,146 A * | 4/1998 | Webster | 369/107 |
| 2001/0038580 A1 * | 11/2001 | Jung | 369/30.23 |
| 2003/0206506 A1 * | 11/2003 | Cohen | 369/47.23 |
| 2004/0139251 A1 * | 7/2004 | Liao | 710/62 |

\* cited by examiner

*Primary Examiner*—Wayne R Young
*Assistant Examiner*—Lixi Chow
(74) *Attorney, Agent, or Firm*—Day Pitney LLP

(57) ABSTRACT

The present invention is a turntable which includes an internal analog to digital converter and a controller for a standard digital format. This allows a jack for a standard digital format to be incorporated into the turntable, so that digital signals are generated to be received by the soundcard of an external computer or similar piece of digital equipment.

6 Claims, 1 Drawing Sheet

PHONOGRAPHIC TURNTABLE WITH BUILT-IN AUDIO TO USB OR FIREWIRE DEVICE

BACKGROUND OF THE INVENTION

1. Field of the Invention

The present invention relates to a phonographic turntable which includes a built-in audio conversion device, which is typically to USB, firewire, or other computer digital communication protocol, inside the turntable.

2. Description of the Prior Art

The standard phonographic turntable, as an analog device, is diminishing in commercial popularity due to the ever increasing capabilities of digital music equipment. Digital music equipment has many advantages in that it can be either connected directly to a home computer or can play music through a common storage device (such as a compact disk). However, the standard phonographic turntable is still embedded within the popular music culture, at least for the reason that many people still own vinyl LPs which may be difficult or even impossible to replace with compact disks. Similarly, the standard phonographic turntable is embedded within the disk jockey culture at dance clubs and similar institutions.

Some applications have connected the line level output of a turntable (or the output of a phono pre-amp which has received the audio output from the phono cartridge) to the analog input of a computer sound card. Other applications have used an external audio conversion device between the turntable and the soundcard.

In addition, there are currently several devices that allow the phonographic turntable to act as a control device, similar to a computer mouse, to modulate or apply some effect (such as "scratching") to audio playing within the computer.

The SPDIF (Sony/Phillips Digital Interface) has been built into some turntables in order to provide a digital output. However, this is not a standard protocol such as USB (universal serial bus) or firewire (IEEE 1394).

OBJECTS AND SUMMARY OF THE INVENTION

It is therefore an object of this invention to provide a turntable which includes digital output in a standard protocol, such as USB or firewire.

It is therefore a further object of the present invention to provide a turntable which eliminates the need for external audio conversion devices.

It is therefore a further object of the present invention to provide a turntable which maintains the familiar feel of a standard turntable to a disk jockey or similar operator.

These and other objects are attained by providing a turntable with such conventional features as a revolving platter, a pivoting tonearm and an analog phono cartridge and further providing an audio conversion device to USB, firewire or other standard computer digital communication protocol internally within the turntable. Therefore, a standard digital output is generated for simple connection to a computer or other digital equipment.

DESCRIPTION OF THE DRAWINGS

Further objects and advantages of the invention will become apparent from the following description and claims, and from the accompanying drawings, wherein:

DETAILED DESCRIPTION OF THE PREFERRED EMBODIMENTS

Figure 1:
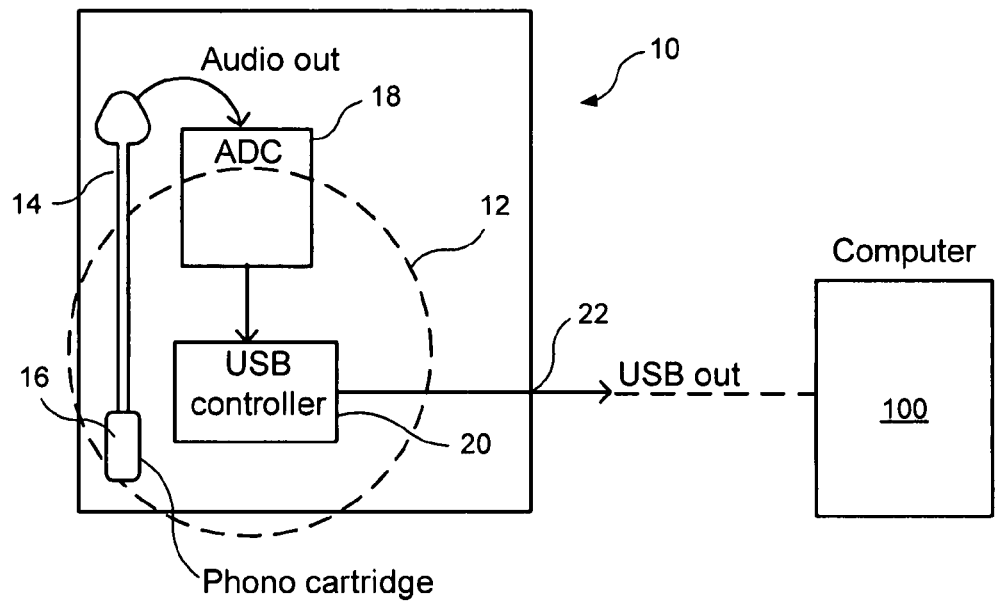
FIG. 1 is a schematic of the USB version of the present invention.

Referring now to the drawings in detail wherein like numerals refer to like elements throughout the several views, one sees that FIG. 1 is a schematic of the turntable 10 of the present invention, in the USB configuration. Turntable 10 includes a rotatable platter 12 (shown in phantom), a pivotable or similar traveling tonearm 14 supporting a phono cartridge 16 at its distal end, typically by way of a conventional attachment between tonearm 14 and phono cartridge 16. The phono cartridge 16 engages a conventional LP record rotating on platter 12. The phono cartridge generates a conventional analog electrical signal, representative of the audio recording on the LP record. The conventional analog electrical signal is received by the analog to digital converter (ADC) 18. The output of the analog to digital converter 18 is digital and is received by the USB controller 20. Both the analog to digital converter 18 and the USB controller 20 are within the turntable 10. This results in a USB signal being generated from the turntable 10 from a USB jack 22 which is on the cabinet of the turntable 10. This USB signal from USB jack 22 can be fed directly to an external computer 100 (or similar digital processing equipment) so that the digital signal, typically a digital audio signal, can be processed by the computer 100.

Figure 2:
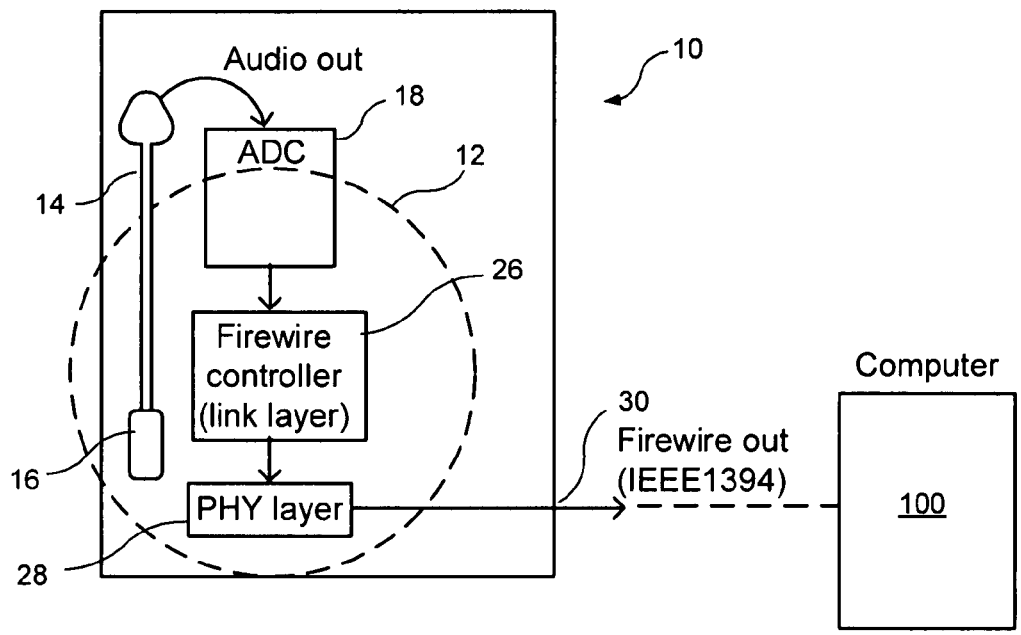
FIG. 2 is a schematic of the firewire version of the present invention.

FIG. 2 is a schematic of turntable 10 of the present invention, in the firewire configuration. Turntable 10 includes a rotatable platter 12 (shown in phantom), a pivotable or similar traveling tonearm 14 supporting a phono cartridge 16 at its distal end, typically by way of a conventional attachment between tonearm 14 and phono cartridge 16. The phono cartridge 16 engages a conventional LP record rotating on platter 12, substantially identical to that shown in FIG. 1. The phono cartridge generates a conventional analog electrical signal, representative of the audio recording on the LP record. The conventional analog electrical signal is received by the analog to digital converter (ADC) 18. The output of the analog to digital converter 18 is digital and is received by the firewire controller (link layer) 26. The output of the rewire controller (link layer) 18 is received by physical (PHY) layer 28. The analog to digital converter 16, the firewire controller (link layer) 26 and the physical SHY) layer 28 are all contained within the turntable 10. This results in a USB signal being generated from the turntable 10 from a firewire jack (IEEE-1394) 30 which is on the cabinet of the turntable 10. This firewire signal from firewire jack 30 can be fed directly to an external computer 100 (or similar digital processing equipment) so that the digital signal, typically a digital audio signal, can be processed by the computer 100.

Thus the several aforementioned objects and advantages are most effectively attained. Although preferred embodiments of the invention have been disclosed and described in detail herein, it should be understood that this invention is in no sense limited thereby and its scope is to be determined by that of the appended claims.

What is claimed is:

1. A turntable including:

a rotatable platter;

a tonearm for receiving a phono cartridge for generating an analog audio signal representative of an audio recording;

an analog to digital converter for receiving an analog audio signal from the phono cartridge; and a controller responsive to said analog to digital converter for generating an output digital audio signal of music or speech representative of an audio recording from an output of said analog to digital converter, representative of said analog audio signal;

wherein said analog to digital converter and said controller are included within said turntable; and wherein said output digital audio signal is output from said turntable and uses standard computer protocol.

2. The turntable of claim 1 wherein said output digital audio signal uses universal serial bus (USB) protocol.

3. The turntable of claim 1 wherein said output digital audio signal uses firewire (IEEE-1394) protocol.

4. The turntable of claim 1 wherein said turntable further includes a jack for outputting said output digital audio signal.

5. The turntable of claim 1 wherein said rotatable platter is configured and arranged to receive a record with an audio recording thereon.

6. The turntable of claim 5 wherein said tonearm is configured and arranged to engage a phono cartridge against a record with an audio recording thereon, the record being supported by said rotatable platter.

* * * * *